United States Patent Office 3,004,979
Patented Oct. 17, 1961

3,004,979
OXIMES OF CERTAIN TETRAHYDROPYRIDINE HYDROCARBON KETONES AND PROCESS
Jean Druey, Riehen, and Karl Schenker, Basel, Switzerland, assignors to Ciba Pharmaceutical Products Inc., Summit, N.J.
No Drawing. Filed Jan. 26, 1960, Ser. No. 4,613
Claims priority, application Switzerland Feb. 12, 1959
10 Claims. (Cl. 260—294.8)

The present invention provides pyridine compounds of the formula $$\text{Py}-\underset{\|}{\text{C}}-\text{R}$$
$$\phantom{\text{Py}-}\text{NOH}$$

in which Py represents a 1-R'-1:2:5:6-tetrahydropyridyl-(3 or 4)-radical, and the radicals R and R' represent hydrocarbon radicals of an aliphatic character and R' may also represent a benzyl radical, and salts of such compounds.

In the new compounds the tetrahydropyridine ring may carry further substituents, for example, lower alkyl radicals Lower hydrocarbon radicals of an aliphatic character are above all lower saturated or unsaturated aliphatic or cycloaliphatic hydrocarbon radicals, such as alkyl, alkenyl or cycloalkyl radicals, for example, methyl, ethyl, propyl, isopropyl, butyl, isobutyl, allyl, cyclopentyl groups and the like. The benzyl radical may be substituted, for example, by lower alkyl, alkoxy or alkyl mercapto groups, nitro, amino or trifluoromethyl groups or halogen atoms.

The new compounds possess valuable pharmacological properties. Even in small doses they cause a parasympathomimetic syndrome, the action on the non-striated muscular organs, such as the intestine, uterus and blood vessels being pronounced. They can accordingly be used as medicaments. They may also, however, serve as intermediate products for the manufacture of medicaments.

Especially valuable are the compounds of the formulae

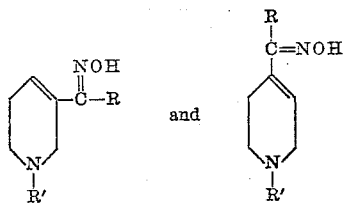

in which R and R' represent lower alkyl radicals, above all methyl groups, and their salts, and especially 1-methyl-3-acetyl-1:2:5:6-tetrahydropyridine-oxime and 1-methyl-4-acetyl-1:2:5:6-tetrahydropyridine-oxime and their salts.

The new compounds may be obtained by reducing a quaternary pyridinium compound of the formula $$\text{Py}'-\underset{\|}{\text{C}}-\text{R}$$
$$\phantom{\text{Py}'-}\text{NOH}$$

in which Py' represents a quaternated pyridyl-(3 or 4)-radical having the grouping

and R and R' have the meanings given above, with a di-light metal hydride, advantageously an alkali metal-boronhydride.

The reduction is carried out in the usual manner. Especially good yields are obtained by the use of alkali-metal-boronhydrides, such as sodium-boronhydride, in aqueous-alcoholic medium, for example, in a methanol-water mixture.

As starting materials there are used in the first place quaternary ammonium salts, such as halides, for example, chlorides, bromides or iodides, sulfates, methyl sulfates, perchlorates or sulfonates, such as benzene sulfonates.

According to the reaction conditions the new compounds are obtained in the form of free bases or their salts with inorganic or organic acids. As salt-forming acids there come into consideration, more especially those which yield therapeutically useful salts, for example, hydrohalic acids, sulfuric acid, phosphoric acids, nitric acid, perchloric acid; aliphatic alicyclic, aromatic or heterocyclic carboxylic or sulfonic acids, such as formic, acetic, propionic, oxalic, succinic, glycolic, lactic, malic, tartaric, citric, ascorbic, oxymaleic, dioxymaleic or pyruvic acid; phenyl acetic, benzoic, para-aminobenzoic, anthranilic, paraoxybenzoic, salicylic or para-aminosalicylic acid; methane sulfonic, ethane sulfonic, oxyethanesulfonic, or ethylene sulfonic acid; toluene sulfonic acids, naphthalene sulfonic acids or sulfanilic acid. The salts can be converted to the free bases in known manner.

The new tetrahydropyridines, their salts or corresponding mixtures find applications, for example, in the form of pharmaceutical preparations. These preparations contain the said compounds in admixture with a pharmaceutical organic or inorganic carrier suitable for enteral or parenteral application. For this purpose there come into consideration such substances as do not react with the described compound, as for example, water, gelatine, lactose, petroleum jelly, starches, magnesium stearate, talc, vegetable oils, benzyl alcohols, gums, polyalkylene glycols, chlolesterol or other known pharmaceutical carriers. The pharmaceutical preparations can be made up, for example, as tablets, dragees or in fluid form as solutions, suspensions or emulsions. If desired they may be sterilized and/or may contain adjuvants, such as preserving, stabilizing, wetting or emulsifying agents. They may also contain other therapeutically valuable substances. The preparations may be made by the usual methods.

The invention also includes any modification of the process in which there is used as starting material an intermediate product obtainable at any stage of the process, and the remaining steps of the process are carried out, or the process is interrupted at any stage.

The acyl-pyridine-derivatives used as starting materials, are known or may be obtained according to known methods, if desired under the reaction conditions.

The invention is illustrated in the following examples, the temperatures being in degrees centigrade:

*Example 1*

To an ice-cooled solution of 5 grams of sodium boronhydride in 50 cc. of water and 50 cc. of methanol were added in drops and with vigorous stirring 20 grams of 1-methyl-4-acetyl-pyridinium-iodide-oxime dissolved in 100 cc. of 50% methanol. The reduction proceeded very rapidly and with a brisk evolution of hydrogen. After the reaction had subsided 200 cc. of water were added slowly. Thereupon 1-methyl-4-acetyl-1:2:5:6-tetrahydropyridine-oxime of the formula

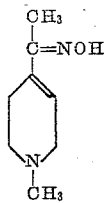

crystallized in the form of fine colorless flakes melting at 163–165°. After a single recrystallization in ethyl acetate the oxime melted at 164–165°.

The hydrochloride of the oxime was obtained by neutralization with hydrochloric acid in ethyl acetate; colorless crystals at 228° (with decomposition).

The starting material was obtained as follows:

36.3 grams of 4-acetyl-pyridine, 21.0 grams of hydroxyl-amine-hydrochloride and 25 cc. of pyridine were heated under reflux in 100 cc. of absolute methanol for 7 hours and then evaporated to dryness. The crystalline residue was pulverized in a mortar and shaken for 30 minutes with 150 cc. of aqueous, dilute ammoniacal solution. It was then allowed to stand for a time on ice, and suction-filtered and the filter cake washed with ice water. There was obtained 4-acetyl-pyridine-oxime melting at 153°.

10 grams of the oxime were dissolved in 100 cc. of ethyl acetate and boiled together with 10 cc. of methyl iodide for 3 hours under reflux. The contents of the flask were then cooled to 0°. Upon suction-filtering the metho-iodide was obtained in the form of yellowish crystals melting at 190–192°.

Example 2

19.5 grams of 1-methyl - 3 - acetyl-pyridinium-iodide-oxime were reduced in the manner described in Example 1 with 5 grams of sodium boron-hydride in 50% aqueous methanol with ice-cooling. There was obtained 1-methyl-3-acetyl-1:2:5:6-tetrahydropyridine-oxime of the formula

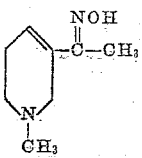

in the form of colorless crystals melting at 154–156°.

The hydrochloride obtained in the usual manner melted, after one recrystallization from methanol-ethylacetate, at 251–252° with decomposition.

The methoiodide used as starting material was obtained from commercial 3-acetyl-pyridine as follows:

50.0 grams of 3-acetyl-pyridine and 29.0 grams of hydroxylamine hydrochloride were boiled in 250 cc. of methanol for 5 hours under reflux. After removal of the solvent the crystalline residue was dissolved in a little water and there was then added a saturated aqueous sodium bicarbonate solution until it gave a slightly alkaline reaction. The oxime precipitated in the form of colorless crystals melting at 115–117°. The hydrochloride produced in the usual manner formed on crystallization from methanol colorless needles melting at 203–204°.

The metho iodide of the oxime was obtained according to the method described in Example 1; yellowish crystals melting at 206–217°.

Example 3

10 grams of 3-acetyl-pyridine-oxime and 10 cc. of ethyl iodide were boiled in 100 cc. of ethyl acetate for 12 hours under reflux. After cooling, the crystalline precipitate was filtered with suction and there was thus obtained after thorough washing with ethyl acetate and ether the iodoethylate melting at 215° (with decomposition).

The reduction of this product with sodium boron-hydride was carried out under the conditions of the preceding examples. 1-ethyl-3 - acetyl-1:2:5:6-tetrahydropyridine-oxime of the formula

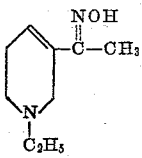

was obtained as a yellow, viscous oil by extraction of the aqueous-methanolic reaction solution with chloroform. The hydrochloride obtained in the usual manner formed, on recrystallization from ethanol, colorless crystals melting at 260° (with decomposition).

Example 4

10 grams of 3-acetyl-pyridine-oxime and 15 cc. of allyl bromide were boiled in 100 cc. of ethyl acetate for 12 hours under reflux. After cooling and suction-filtering there was obtained 1-allyl - 3-acetyl-pyridinium-bromide-oxime melting at 205° (with decomposition). By reduction with sodium boronhydride according to the process described in Example 1 this compound was reduced to 1-allyl - 3 - acetyl-1:2:5:6-tetrahydropyridine-oxime of the formula

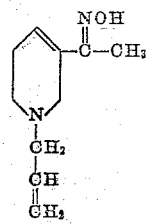

The new oxime was obtained in the form of a light brown viscous oil; its hydrochloride obtained in the usual manner formed on crystallization from ethanol-ethyl-acetate colorless crystals melting at 181–182°.

Example 5

From 10 grams of 3-acetyl-pyridine-oxime and 10 grams of 2-bromo-propane there was obtained after boiling under reflux in 25 cc. of ethanol for 12 hours 1-isopropyl-3-acetyl-pyridinium-bromide-oxime, which crystallized from ethanol-ether in colorless flakes melting at 213–215°.

Reduction with sodium boron-hydride under the conditions given in Example 1 yielded 1-isopropyl-3-acetyl-1:2:5:6-tetrahydropyridine-oxime of the formula

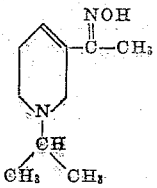

as a light yellow, thickly liquid oil. The hydrochloride obtained in the usual manner was crystallized from ethanol-ethylacetate. It formed colorless flakes melting at 214° (with decomposition).

Example 6

Upon reduction of 18.5 grams of 1-methyl-propionyl-pyridinium-iodide-oxime with 5 grams of sodium boron-hydride under the reaction conditions described in Example 1 there was obtained, after extraction of the reaction solution with chloroform, 1-methyl-3-propionyl-1:2:5:6-tetrahydropyridine-oxime of the formula

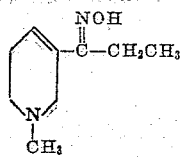

in the form of flesh-colored crystals melting at 155–157.5°. After one crystallization from chloroform-ethyl-acetate the melting point was raised to 157.5–158°. The hydrochloride obtained in the usual manner in the form of colorless flakes melted, on crystallization from ethanol, at 216° (with decomposition).

The 1-methyl-3-propionyl-pyridine used as starting material for the reduction was synthesized as follows:

12.5 grams of magnesium chips and 78 grams of ethyl iodide were converted in the usual manner in anhydrous ether into the Grignard compound, which was transferred to a dropping funnel. The solution was added in drops and with vigorous stirring to a solution of 52.0 grams of 3-cyanopyridine in 300 cc. of anhydrous benzene.

Upon warming a voluminous precipitate formed, which if necessary could be diluted with the addition of a further 100 cc. of benzene, in order to avoid blocking of the stirrer. The reaction mixture was heated for 30 minutes to 50° and then allowed to stand overnight. With ice-cooling there were added slowly 200 cc. of 5-n.-hydrochloric acid and the contents of the flask were transferred to a separating funnel. The aqueous layer was separated and the benzene-ether-phase was shaken once more with 50 cc. of 2-n.-hydrochloric acid. The combined aqueous extracts were extracted with 50 cc. of ether and treated with 1 gram of activated charcoal. After heating for a short time the extract was filtered, cooled to 0° and rendered alkaline with concentrated ammonia. Extraction with chloroform yielded a dark oil, which was fractionally distilled over a Vigreux-Hillman-column.

*Fraction 1.*—Boiling point 98–104° under 11 mm. of pressure, 23.3 grams; contained in addition to 3-propionyl-pyridine, on the basis of the infrared-absorption spectrum, still about 10% 3-cyanopyridine.

*Fraction 2.*—Boiling point 104–109° under 11 mm. of pressure, 14.5 grams; was pure 3-propionyl-pyridine.

14.5 grams of 3-propionyl-pyridine and 7.5 grams of hydroxylamine hydrochloride were heated in 50 cc. of methanol for 2 hours under reflux. After evaporation the residue obtained was mixed with chloroform, dilute ammonia was added until an alkaline reaction was obtained, the aqueous layer was separated and the chloroform-solution was washed with water until neutral. After evaporation, the remaining residue was recrystallized from benzene-petroleum ether. 3-propionyl-pyridine-oxime was obtained in the form of colorless prisms melting at 116–117°.

10 grams of the oxime, 10 cc. of methyl iodide and 100 cc. of ethyl acetate were heated under reflux for 2 hours to boiling. The reaction mixture was allowed to stand for 15 hours and was filtered with suction, and the methoiodide crystallized out in the form of yellowish needles; melting point 172–174°.

What is claimed is:

1. Pyridine compounds of the formula:

$$Py-\overset{\overset{NOH}{\|}}{C}-R$$

in which Py is a member selected from the group consisting of unsubstituted and lower alkyl 1-R'-1:2:5:6-tetrahydro-pyridyl said pyridyl radical being attached at one of the positions 3 and 4 to the carbon atom bearing the oxime group, R stands for a member selected from the group consisting of lower alkyl, lower alkenyl and cyclopentyl, and R' is a member selected from the group consisting of lower alkyl, lower alkenyl, cyclopentyl and benzyl and therapeutically useful acid addition salts thereof.

2. A compound of the formula:

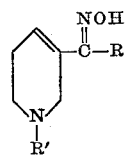

in which R and R' stand for lower alkyl.

3. A therapeutically useful acid addition salt of a compound of claim 2.

4. A compound of the formula:

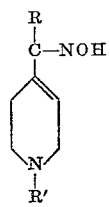

in which R and R' stand for lower alkyl.

5. A therapeutically useful acid addition salt of a compound of claim 4.

6. 1-methyl-3-acetyl-1:2:5:6-tetrahydropyridine-oxime.

7. A therapeutically useful acid addition salt of a compound of claim 6.

8. 1-methyl-4-acetyl-1:2:5:6-tetrahydropyridine-oxime.

9. A therapeutically useful acid addition salt of a compound of claim 8.

10. Process for the manufacture of new pyridine derivatives, wherein a quaternary pyridinium compound of the formula:

$$Py'-\overset{\overset{NOH}{\|}}{C}-R$$

in which Py' is selected from the group consisting of unsubstituted and lower alkyl quaternized pyridyl radical having the grouping:

said pyridyl radical being attached at one of the positions 3 and 4 to the carbon atom bearing the oxime group, and R is selected from the group consisting of lower alkyl, lower alkenyl and cyclopentyl and R' stands for a member selected from the group consisting of lower alkyl, lower alkenyl, cyclopentyl and benzyl, is treated with an alkali metal borohydride.

References Cited in the file of this patent
UNITED STATES PATENTS
2,816,113    Wilson _____ Dec. 10, 1957
OTHER REFERENCES
Albers et al.: Ber. Deut. Chem., vol. 773, pages 617–26 (1944).

UNITED STATES PATENT OFFICE
CERTIFICATE OF CORRECTION

Patent No. 3,004,979              October 17, 1961

Jean Druey et al.

It is hereby certified that error appears in the above numbered patent requiring correction and that the said Letters Patent should read as corrected below.

Column 1, line 22, after "radicals" insert -- such as a methyl group. --; column 2, line 29, for "chlolesterol" read -- cholesterol --; column 6, lines 13 to 21, the formula should appear as shown below instead of as in the patent:

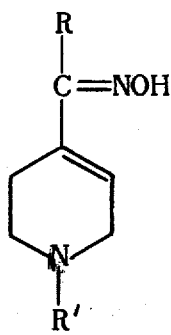

Signed and sealed this 17th day of July 1962.

(SEAL)
Attest:

ERNEST W. SWIDER              DAVID L. LADD

Attesting Officer              Commissioner of Patents